(No Model.) 2 Sheets—Sheet 1.
J. LOMAS.
TREE FELLING AND LOG SAWING MACHINE.
No. 552,963. Patented Jan. 14, 1896.
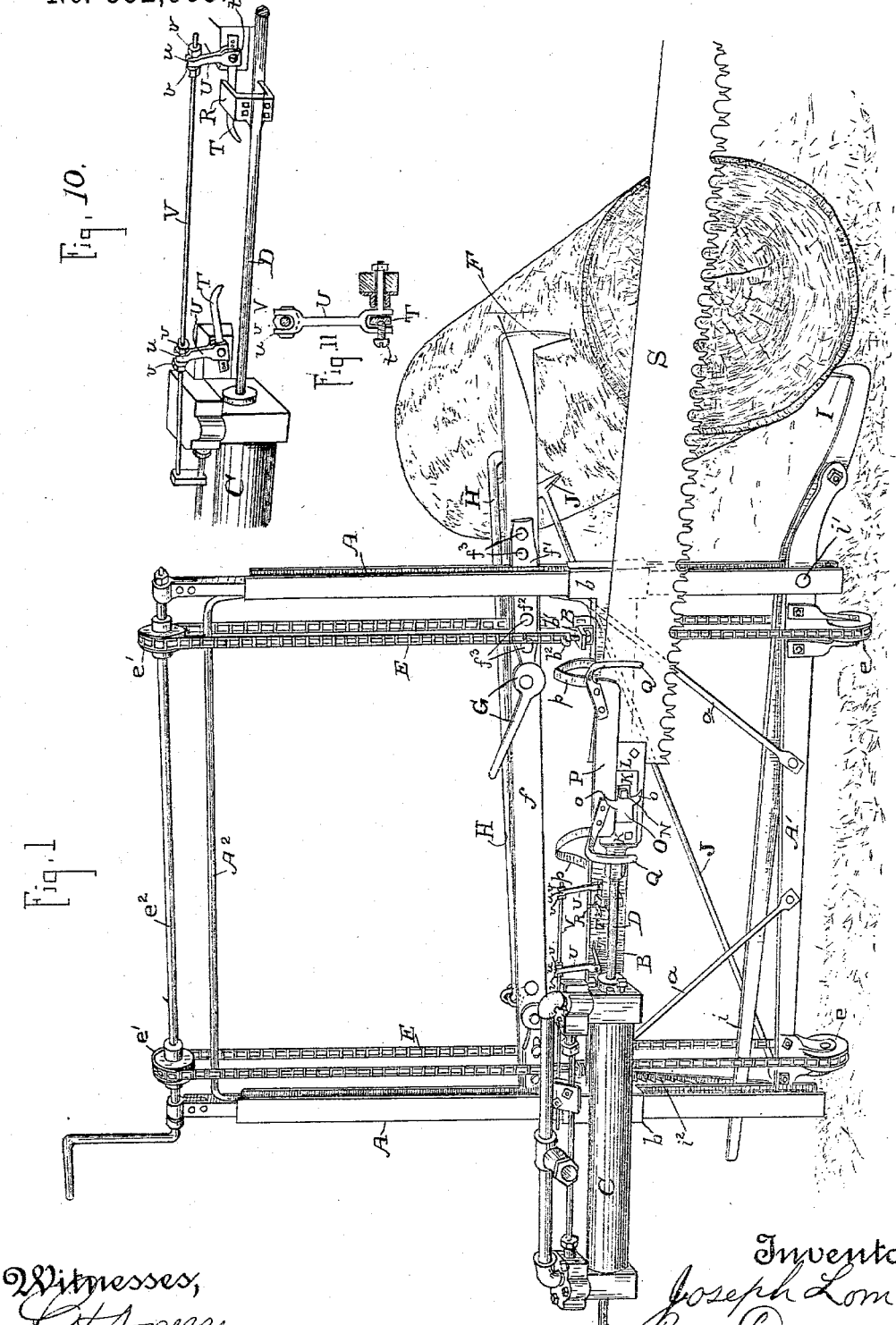
Witnesses,
Inventor
Joseph Lomas

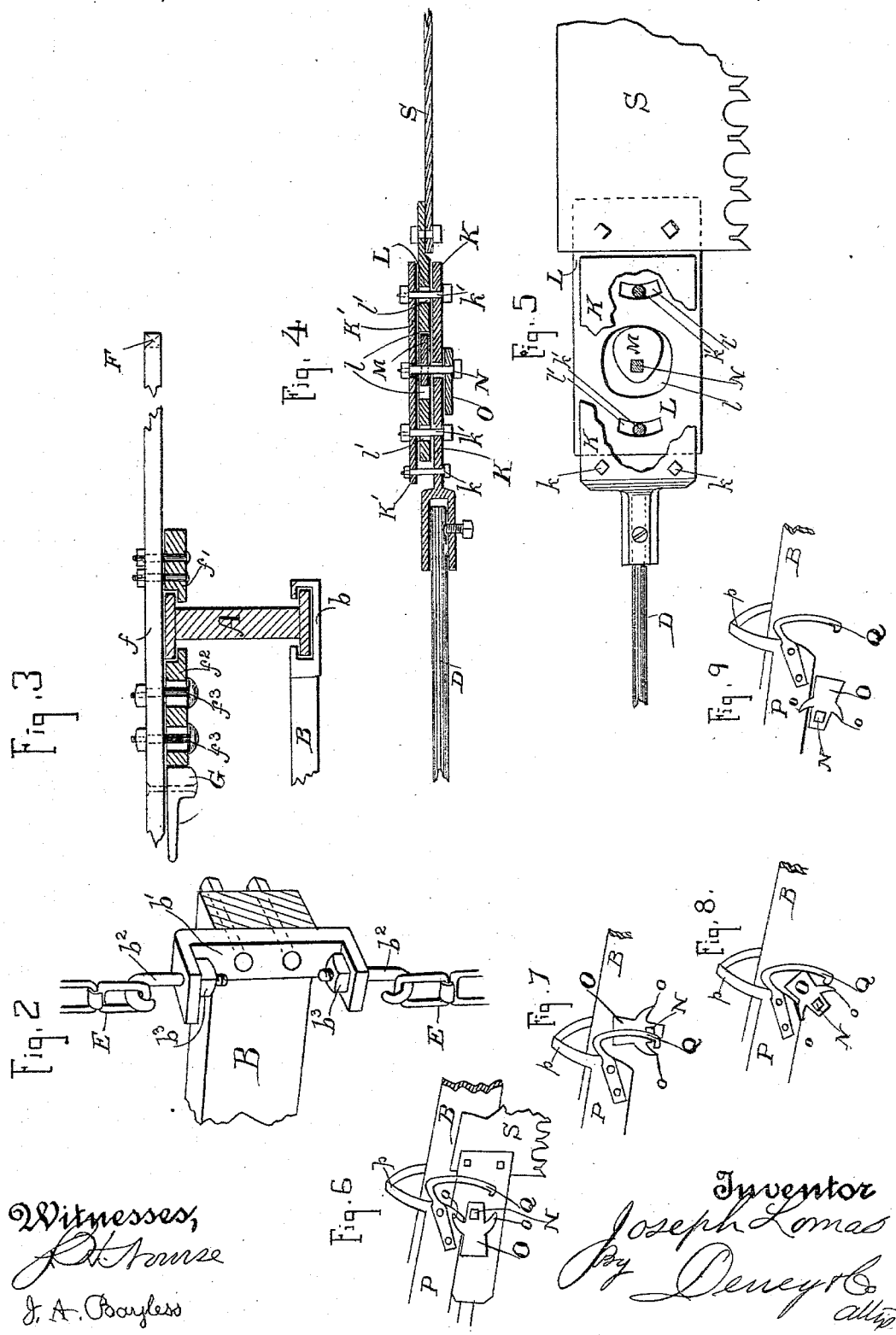

UNITED STATES PATENT OFFICE.

JOSEPH LOMAS, OF ASHLAND, OREGON.

TREE-FELLING AND LOG-SAWING MACHINE.

SPECIFICATION forming part of Letters Patent No. 552,963, dated January 14, 1896.

Application filed June 25, 1895. Serial No. 554,044. (No model.)

*To all whom it may concern:*

Be it known that I, JOSEPH LOMAS, a citizen of the United States, residing at Ashland, Jackson county, State of Oregon, have invented an Improvement in Tree-Felling and Log-Sawing Machines; and I hereby declare the following to be a full, clear, and exact description of the same.

My invention relates to the class of machines for sawing trees and logs, and especially to a machine for cutting both standing and fallen timber, applicable on mountain sides or elsewhere.

My invention consists of the constructions and combinations of parts hereinafter described and claimed.

The object of my invention is to provide a machine adapted for the cutting of both standing and fallen timber, the power being derived from compressed air or steam, or other suitable medium, which is conducted through a hose or other conduit from the power-generator to any distance desired, whereby the machine itself, which is firmly fastened to the tree or log in any position or on any ground, no matter how steep, rocky, or swampy, may be operated within a given radius without the necessity of moving the source of power.

Referring to the accompanying drawings for a more complete explanation of my invention, Figure 1 is a perspective view of my machine. Fig. 2 is a detail of the connection between the carrying-beam B and the chain E. Fig. 3 is a horizontal section through one of the uprights, showing the clamping of the dog-shank thereto, and also the fitting of the carrying-beam to said upright. Fig. 4 is a horizontal section showing the connection between the piston-rod and saw. Fig. 5 is a side view of same, the outer plate K being broken away. Figs. 6, 7, 8, and 9 show the several positions of the contact-arm O upon reaching the outward limit of the saw-stroke and return therefrom. Fig. 10 is a view of the cut-off. Fig. 11 is a cross-sectional view on the line 2 2 of Fig. 10.

The frame of the machine consists of two uprights A, a bottom cross-bar A' and a top cross bar $A^2$. The uprights A are of an I shape in cross-section, thus giving a suitable slide-surface on each side without interfering with any of the braces, two of which are represented by $a$ extending upwardly from the lower cross-bar A'. Mounted by means of slides $b$ upon the front sliding-surfaces of the uprights is a cross-beam B, to which is securely bolted the cylinder C. This cylinder has within it a piston, the rod D of which is shown, and is connected with the saw S in a manner I shall presently describe.

The cylinder C forms part of an engine which is provided with the various parts necessary to such devices—such as valves, inlets and exhausts, ports, &c.—unnecessary herein to describe, it being understood that steam or compressed air or other suitable power medium is to be furnished to operate the engine, said power medium being brought from a source at any distance from the machine, preferably through a flexible hose, whereby the machine itself may be moved to various places within a given radius without the necessity of moving the source of the power medium.

The cross-beam B which carries the engine and saw is adapted, as before stated, to slide upon the uprights, this movement being necessary to give the proper feed to the saw as it passes through its work. The means for effecting this adjustment of the beam are as follows:

E are endless chains passing over sprockets $e$, which are secured to the lower cross-bar, and sprockets $e'$, which are on a crank-shaft $e^2$ above. The connection between the chains and the cross-beam may be of any suitable character, and I have here shown it as consisting of short bars $b'$ bolted or riveted to the beam and having in their ends hook-bolts $b^2$ adapted to engage the links of the chain, said bolts being adjustable by means of nuts $b^3$ whereby the chains may be tightened. Now, by operating the crank-shaft, the cross-beam may be lowered gradually to permit the feed of the saw through the work, and said crank-shaft may be operated by hand; or, if desired, proper power mechanism may be applied.

The frame is made fast to the log or tree by means of suitable dogs. One of these, the upper main dog, is designated by F, and its shank $f$ is free of the frame, but is adapted to be clamped thereto as follows: Upon the stem or shank is fitted a fixed jaw $f'$, which bears against the outer edges of the inner sliding-surfaces of the standards or uprights. Upon the shank is also fitted a sliding jaw $f^2$, which is adapted to bear against the opposite edge of the inner sliding-surface of the uprights, said jaw being adapted to slide by means of bolts $f^3$ passing through elongated slots in said jaw. Bearing against the inner end of this sliding jaw is the cam-head of the pivoted lever G, by the movement of which the sliding jaw is set up, so that the uprights are embraced tightly between the two jaws, and thus the shank of the dog is clamped firmly and quickly to said uprights. By relieving the cam-headed lever G the sliding jaw is relieved and the shank and dog may be moved up and down to the proper height to accommodate the size of log to be worked upon. In the same way when the frame is in a horizontal position, in order to work upon a standing tree, the dog is adjusted along the standards or uprights. Connected to the stem or shank $f$ of the dog F, by means of a knuckle or hinge joint, is the supplemental dog H, which is adapted to be driven into the log at an angle to the main dog, so as to steady the frame and prevent side motion. Pivoted at $i'$ to an extension of the lower cross-bar A' of the frame is the lower main dog I, the handle or shank $i$ of which is adapted to engage with a rack $i^2$, secured to one of the frame-uprights, whereby said dog may be held in the position in the log to which it is adjusted. Connected with the lower cross-bar is a supplemental dog J adapted to be driven in the log and in connection with the other supplemental dog H to steady the frame and prevent side motion. These four dogs thus hold the frame firmly to the log or to the tree, as the case may be, the frame being in the former case in an upright position and in the latter case in a horizontal position.

The connection between the piston-rod and the saw is as follows: The piston-rod is directly fitted and secured in the socketed head of a plate K. To the end of the saw is firmly secured a plate L, having made in it an elliptical or cam hole $l$, in which is fitted an oscillating cam M, fast upon a short shaft N, which passes outwardly through the plate K, and has firmly fixed to its outer end a contact-arm O, having the oppositely-extending fingers $o$.

K' is an inner plate which is bolted to the outer plate K by bolts $k$ at their inner ends, and other bolts $k'$ passing between them also pass freely through elongated curved slots $l'$ in plate L, whereby the plate L and the saw are connected to plates K and K', and at the same time said plate L may have an up-and-down movement.

Secured to the cross-beam by means of upwardly-arched braces $p$ is a contact-bar P, to each end of which is secured a contact-arm Q, said arms lying in the path of movement of the fingers $o$ of the contact-arm O, which said arm lies flush with the contact-bar P.

The operation is as follows: On the outward movement of the saw the lower finger $o$ comes in contact with the forward contact-arm Q, and the shaft N is thereby given a quarter-revolution, and then as the saw begins to return, the arm O, which by the first movement has been thrown up, comes in contact with the end of bar P, whereby shaft N is given another quarter-revolution in the same direction, so that by these movements the cam or eccentric M is rocked through a half-revolution, and working in the elliptical hole of the plate L, causes the downward movement of the rear end of the saw and the upward movement of its forward end, whereby the chips and sawdust are withdrawn from the kerf. As the fingers $o$ reach the other contact-bar Q at the other end and as the saw advances the reverse operation takes place, so that the front of the saw is depressed in order to make the cut, thus imparting to the saw a movement very similar to that given to it by hand. The arched form of the braces $p$ permits this rise and fall of the saw without interfering with it.

The cut-off mechanism for the engine is as follows: On the piston-rod is a block R which is adapted to come in contact with the upturned end of a latch T, which is set adjustably by a screw $t$ in the end of a pivoted lever U, which has a yoke $u$ adapted to slide between collars $v$ on the valve-rod V. As the piston-rod returns, its block coming in contact with the latch raises it, and thereby swings the lever U so that the yoke moves the valve-rod. Continued movement raises the latch parallel with the block, so that said block slides along under the latch until the reversing medium overcomes the momentum of the piston and sends it on its return stroke without jar, as smooth as if controlled by a balance-wheel. The latch T being held by a set-screw can be adjusted so as to make the cut-off just right and the piston can spend its momentum against the reverse medium.

Having thus described my invention, what I claim as new, and desire to secure by Letters Patent, is—

1. In a tree felling and log sawing machine, the combination, of a frame having uprights, a cross beam fitted between and adapted to slide up and down upon the uprights, chains guided by pulleys on the frame above and below and connected with the cross beam, a crank shaft for operating the chains to raise and lower the cross beam, an engine carried by the cross beam and adapted to be operated by suitable medium, a saw connected with the piston-rod of the engine, a dog having fixed and sliding jaws to engage the inner and outer edges of the frame uprights, and means for setting up the sliding jaws, a lower dog fulcrumed to the frame below and engaged by a rack, and supplemental dogs, one fitted to the shank of the upper dog and the other to the lower cross bar of the frame, all arranged substantially as and for the purpose herein described.

2. In a tree felling and log sawing machine, the combination of a frame having uprights, a cross beam fitted between and adapted to slide up and down upon the uprights, chains guided by pulleys on the frame above and below and connected with the cross beam, a crank shaft for operating the chains to raise and lower the cross beam, an engine carried by the cross beam and having a piston-rod, a saw, the connection between the saw and the piston-rod consisting of plates secured respectively to the piston-rod and saw, said saw plate having a cam hole and curved slots to receive bolts from the other plate, the shaft with its cam and contact arm with fingers and the fixed contact bar, and suitable dogs for connecting the main frame with the log.

3. In a tree felling and log sawing machine, the combination, of a frame having uprights of I-form in cross section, a dog having fixed and sliding jaws to engage the inner and outer edges of said uprights, means for setting up the slidable jaws whereby the fixed and slidable jaws engage their respective edges of the uprights and the dog is adjustably held, a lower dog fulcrumed between its ends and the swinging supplemental dogs one of which is fitted to the shank of the upper main dog while the other is connected with the cross bar of the frame, said supplemental dogs serving to connect the machine with the log or tree.

4. In a tree felling and log sawing machine, an engine having a piston-rod, and a saw, in combination with the connection between the piston-rod and the saw, consisting of the plate to which the piston-rod is secured, the plate to which the saw is secured having a cam hole and curved slots which receive bolts from the piston-rod plate, an oscillating cam operating in said cam hole, a shaft on which the cam is mounted, the contact arm with its fingers carried by the outer end of the shaft, and the fixed contact bar with its fixed contact arms whereby the connected end of the saw is given an up and down movement substantially as herein described.

In witness whereof I have hereunto set my hand.

JOSEPH LOMAS.

Witnesses:
  H. C. MYER,
  A. HUNSAKER.